United States Patent
Azzouz et al.

(10) Patent No.: US 11,780,321 B2
(45) Date of Patent: Oct. 10, 2023

(54) COOLING MODULE FOR AN ELECTRIC MOTOR VEHICLE, COMPRISING A TANGENTIAL-FLOW TURBOMACHINE

(71) Applicant: Valeo Systemes Thermiques, Le Mesnil Saint-Denis (FR)

(72) Inventors: Kamel Azzouz, Le Mesnil Saint Denis (FR); Sébastien Garnier, Le Mesnil Saint Denis (FR); Michael Lissner, Le Mesnil Saint Denis (FR); Amrid Mammeri, Le Mesnil Saint Denis (FR)

(73) Assignee: Valeo Systemes Thermiques, Le Mesnil Saint-Denis (FR)

( * ) Notice: Subject to any disclaimer, the term of this patent is extended or adjusted under 35 U.S.C. 154(b) by 0 days.

(21) Appl. No.: 17/613,288

(22) PCT Filed: May 18, 2020

(86) PCT No.: PCT/EP2020/063763
§ 371 (c)(1),
(2) Date: Nov. 22, 2021

(87) PCT Pub. No.: WO2020/239485
PCT Pub. Date: Dec. 3, 2020

(65) Prior Publication Data
US 2022/0227221 A1    Jul. 21, 2022

(30) Foreign Application Priority Data
May 24, 2019   (FR) ........................... 1905466

(51) Int. Cl.
*B60K 11/08*      (2006.01)
*F01P 11/10*      (2006.01)
*F01P 5/06*       (2006.01)

(52) U.S. Cl.
CPC ............. *B60K 11/085* (2013.01); *F01P 11/10* (2013.01); *F01P 5/06* (2013.01)

(58) Field of Classification Search
CPC .. B60K 11/08; B60K 11/06; F01P 5/06; F01P 11/10
See application file for complete search history.

(56) References Cited

U.S. PATENT DOCUMENTS 4,519,343 A * 5/1985 Hayashi ................... F01P 5/06
                                                      123/41.65
4,702,079 A * 10/1987 Saito ..................... F28D 1/0316
                                                         165/41

(Continued)

FOREIGN PATENT DOCUMENTS

EP          1715157 A1    10/2006
JP          H11-321347 A   11/1999

OTHER PUBLICATIONS

International Search Report with Written Opinion in corresponding International Application No. PCT/EP2020/063763, dated Sep. 1, 2020 (12 pages).

*Primary Examiner* — Long T Tran
(74) *Attorney, Agent, or Firm* — Osha Bergman Watanabe & Burton LLP

(57) ABSTRACT

The invention relates to a cooling module (22) for a motor vehicle (10), comprising: —at least one heat exchanger (301-303) delimiting a surface, referred to as the working surface, —at least one first tangential-flow turbomachine (28-1) and a second tangential-flow turbomachine (28-2), each of said turbomachines (28-1, 28-2) being capable of creating an air flow in contact with said working surface, each of said turbomachines comprising a rotor rotating about an axis and a volute for housing the rotor, comprising an air guiding portion and an air outlet outside the turbomachine, said turbomachines (28-1, 28-2) being arranged such that the (Continued)

air outlet of the first turbomachine (28-1) is arranged opposite the guiding portion of the second turbomachine (28-2).

7 Claims, 6 Drawing Sheets

(56) References Cited

U.S. PATENT DOCUMENTS

| | | | | |
|---|---|---|---|---|
| 6,401,801 | B1* | 6/2002 | Dicke | F01P 5/02 |
| | | | | 165/41 |
| 7,537,072 | B2* | 5/2009 | Sturmon | F01P 1/06 |
| | | | | 180/69.2 |
| 7,703,282 | B1* | 4/2010 | Meissner | F02B 29/0462 |
| | | | | 165/41 |
| 2005/0000214 | A1* | 1/2005 | Driver | F01C 20/14 |
| | | | | 60/597 |
| 2013/0063071 | A1* | 3/2013 | Walters | B60L 8/006 |
| | | | | 320/101 |
| 2015/0101550 | A1* | 4/2015 | Nam | B60K 11/08 |
| | | | | 123/41.31 |
| 2015/0121945 | A1* | 5/2015 | Kamoshida | B23P 15/26 |
| | | | | 29/890.035 |
| 2022/0041034 | A1* | 2/2022 | Garnier | B60K 11/08 |

* cited by examiner

COOLING MODULE FOR AN ELECTRIC MOTOR VEHICLE, COMPRISING A TANGENTIAL-FLOW TURBOMACHINE

TECHNICAL FIELD

The invention relates to the field of motor vehicles, and more particularly to the field of air circulation for cooling the engine and its equipment.

PRIOR ART

Motor vehicles, whether of the combustion or electric type, have to discharge the heat generated by their operation, and are equipped with heat exchangers for this purpose. A motor vehicle heat exchanger generally comprises tubes in which a heat transfer fluid, in particular a liquid such as water, is intended to circulate, and heat exchange elements connected to these tubes, often designated by the term "fins" or "inserts". The fins are used to increase the exchange surface between the tubes and the ambient air.

However, in order to further increase the heat exchange between the heat transfer fluid and the ambient air, a ventilation device is often used in addition, to generate or increase a flow of air directed toward the tubes and the fins.

As is known, such a ventilation device comprises a blower-wheel fan.

The flow of air generated by the blades of such a fan is turbulent, in particular because of the circular geometry of the blower wheel, and generally reaches only part of the surface of the heat exchanger (the circular region of the exchanger that faces the blower wheel of the fan). The exchange of heat is therefore not uniform across the entire surface of the tubes and of the fins.

Furthermore, when it is not necessary for the fan to be switched on (typically when the exchange of heat with non-accelerated ambient air is sufficient to cool the heat transfer fluid circulating in the exchanger), the blades partially obstruct the flow of the ambient air toward the tubes and the fins, thus impeding the circulation of air toward the exchanger and thus limiting the exchange of heat with the heat transfer fluid.

Such a fan is also relatively bulky, in particular because of the necessary dimensions of the blower wheel in order to obtain effective engine cooling, and this makes incorporating it into a motor vehicle a lengthy and difficult process.

This incorporation is all the more complicated in an electric vehicle, the front face of which leaves very little space in which to house the vehicle cooling elements.

The object of the invention is to at least partially overcome these drawbacks.

SUMMARY

To this end, the invention relates to a cooling module for a motor vehicle, comprising at least one heat exchanger defining a surface, referred to as the working surface, at least a first tangential-flow turbomachine and a second tangential-flow turbomachine, each of said turbomachines being capable of creating a flow of air in contact with said working surface, each of said turbomachines comprising a rotor rotatably mounted about an axis of rotation and a volute for housing the rotor, including an air guiding portion and an air outlet from the turbomachine, said turbomachines being arranged so that the air outlet of the first turbomachine is positioned facing the guiding portion of the second turbomachine.

The heat exchanger(s) thus advantageously has/have dimensions suitable for being cooled by means of one or more lower cooling openings only. Furthermore, the tangential-flow turbomachines make it possible to create a flow of air through all of the heat exchangers with significantly better efficiency than if a blower-wheel fan were used.

In addition, the arrangement of the two turbomachines makes it possible to reduce or even prevent any impact between two air jets leaving the turbomachines, which ensures that the cooling module has satisfactory ventilation and acoustic performance.

According to another aspect, the axis of rotation of the first tangential-flow turbomachine and the axis of rotation of the second tangential-flow turbomachine are mounted parallel to each other.

According to another aspect, the axis of rotation of the first turbomachine is positioned facing an end edge of the working surface and the axis of rotation of the second turbomachine is positioned facing the inside of the working surface.

According to another aspect, the working surface is delimited by a first direction, referred to as the length, and a second direction, referred to as the height, orthogonal to the length, the axis of rotation of the second turbomachine being positioned in a zone between one fifth and four fifths of said height.

According to another aspect, the axis of rotation of the second turbomachine is positioned in a zone between one third and two thirds of said height.

According to another aspect, in the installed position of the module in the motor vehicle, the outlet of the first turbomachine is positioned facing the guiding portion of the second turbomachine.

According to another aspect, the module comprises air guiding shutters pivotably mounted between a closed position of the cooling module and at least one open position of the cooling module.

The invention also relates to a motor vehicle with an electric motor, comprising a body, a bumper and a as described above, the body defining at least one cooling opening positioned below the bumper, the cooling module being positioned facing the at least one cooling opening.

BRIEF DESCRIPTION OF THE DRAWINGS

Further features, details and advantages of the invention will become apparent upon reading the following description. This description is purely illustrative and should be read with reference to the appended drawings, in which.

DESCRIPTION OF EMBODIMENTS

In the remainder of the description, elements that are identical or perform identical functions bear the same reference sign. In the present description, for the sake of conciseness, these elements are not described in detail within each embodiment. Rather, only the differences between the variants are described in detail.

It will be noted that, in the preferred examples illustrated, each turbomachine operates by suction, that is, it draws in ambient air and conveys it so that it comes into contact with the various heat exchangers, as will be explained in detail. Alternatively however, each turbomachine operates by blowing, blowing the air toward the various heat exchangers.

Figure 1:
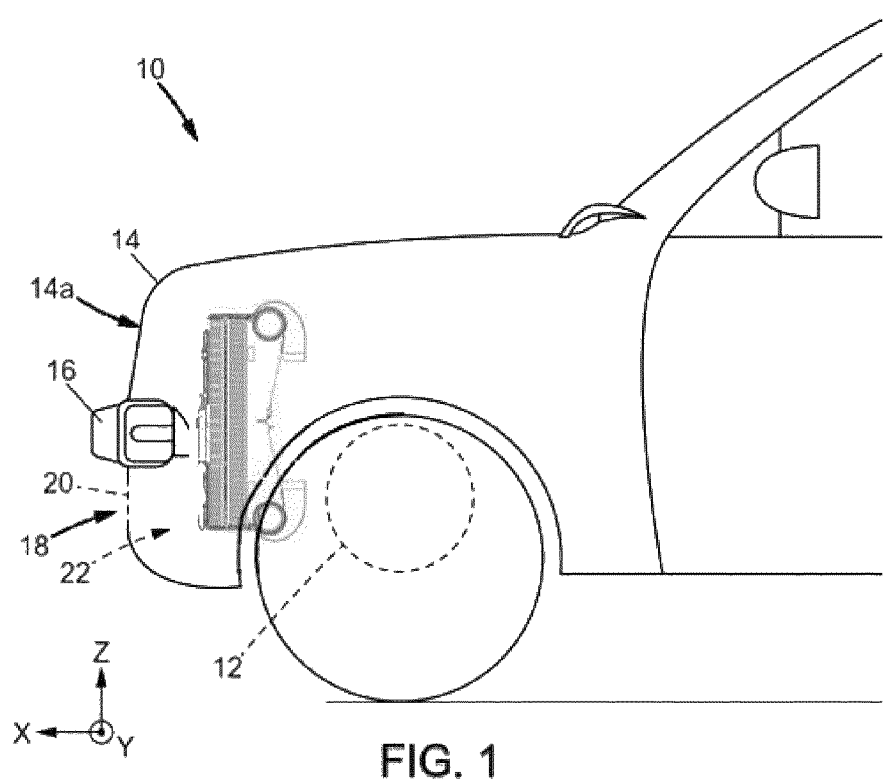
FIG. 1 schematically shows the front part of a motor vehicle with an electric motor, viewed from the side.

FIG. 1 schematically illustrates the front part of a motor vehicle 10 with an electric motor 12. The vehicle 10 comprises in particular a body 14 and a bumper 16 carried by a chassis (not shown) of the motor vehicle 10. The body 14 defines a cooling opening 18, that is, an opening through the body 14. Here there is only one cooling opening 18. This cooling opening 18 is situated in the lower part of the front face 14a of the body 14. In the example illustrated, the cooling opening 18 is situated below the bumper 16. A grille 20 can be positioned in the cooling opening 18 to prevent projectiles from being able to pass through the cooling opening 18. A cooling module 22 is positioned facing the cooling opening 18. The grille 20 in particular provides protection for the cooling module 22.

The cooling module 22 comprises a ventilation device 24 associated with at least one heat exchanger.

As is evident from the figures, the ventilation device 1 comprises at least one tangential-flow fan, also referred to below as a tangential-flow turbomachine, which draws in a flow of air F bound for the heat exchanger or heat exchangers. In the embodiments illustrated, the cooling module comprises two turbomachines 28-1, 28-2, described in detail below.

As illustrated, the cooling module 22 essentially includes a housing or fairing 24 forming an internal air channel. The fairing 24 makes it possible to house at least one tangential-flow turbomachine. Here, a rear part of the fairing in particular forms the volute of the tangential-flow turbomachine 28.

As is evident from the figures, the turbomachines 28-1, 28-2 make it possible to cool one or more heat exchangers $30_1$-$30_3$.

Each tangential-flow turbomachine comprises a rotor or turbine 32-1, 32-2 (or tangential blower wheel). The turbine is substantially cylindrical. The turbine advantageously includes several stages of blades (or vanes). The turbine is rotatably mounted about an axis of rotation $A_{32-1}$, $A_{32-2}$.

The embodiments in FIGS. 2 to 6 will now be described.

As is evident from these figures, the cooling module 22 comprises a first turbomachine 28-1 and a second turbomachine 28-2, according to the turbomachine 28 described previously.

In FIGS. 2 to 6, the assembled heat exchangers define a surface S, referred to as the working surface, a cross-section of which is substantially rectangular in a plane (Y, Z).

Preferably, the direction Y corresponds to a horizontal direction, while the direction Z corresponds to a vertical direction, when the module is installed in the motor vehicle.

The surface S is delimited by two opposite end edges 38, 39 extending in the direction Y, referred to as the length, and by another two opposite end edges 40, 41, in the direction Z.

Figure 5:
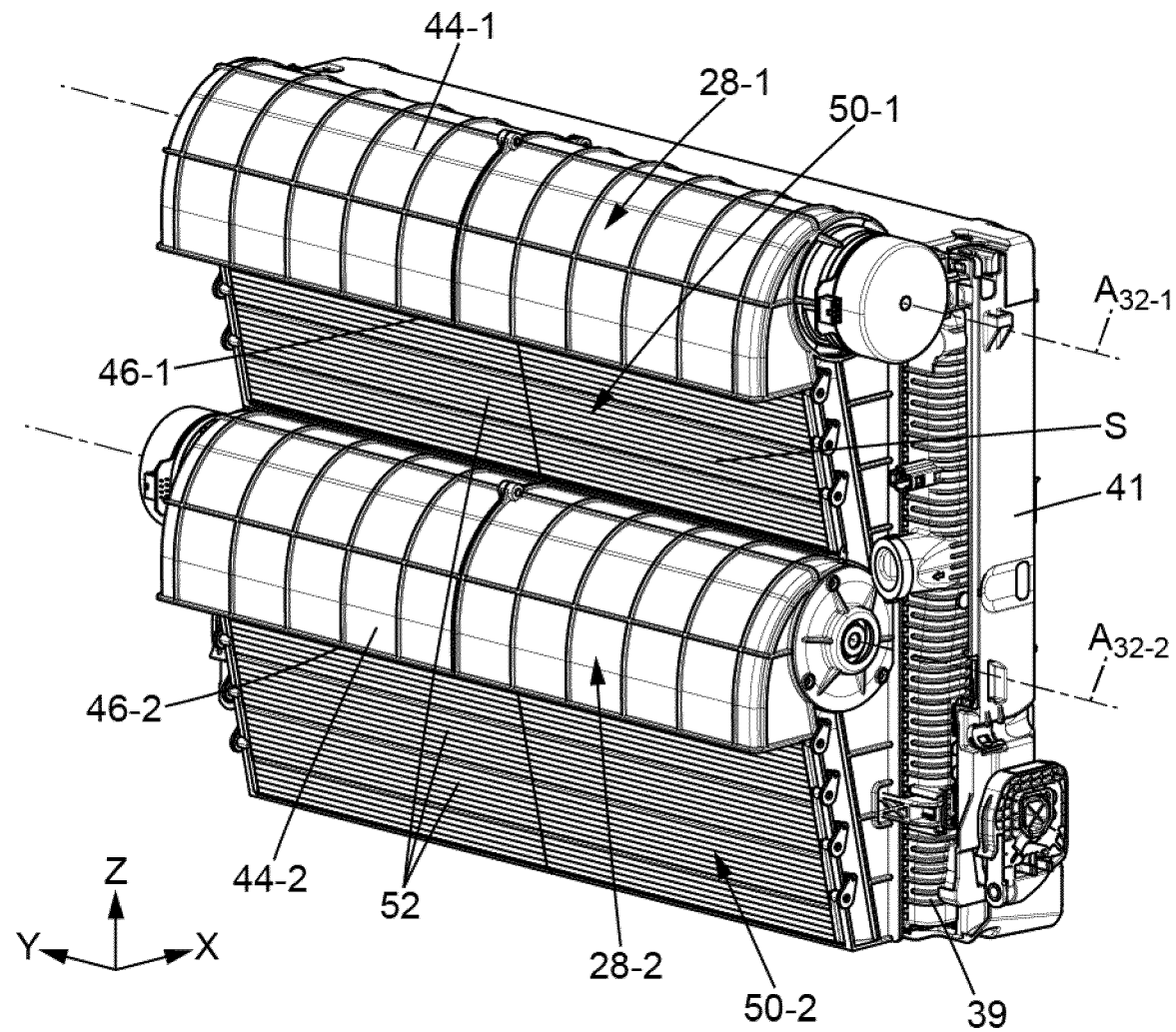
FIG. 5 is a perspective view of the module in FIG. 3, with guiding shutters.

In FIG. 5, the surface S corresponds to the rectangle defined by the exchanger 30, or if there are several exchangers present, by the largest heat exchanger. It is however also possible to juxtapose several exchangers vertically and/or horizontally, in which case the height of the surface S is the sum of the heights of the vertically juxtaposed (stacked) exchangers, and the length of the surface S is the sum of the lengths of the horizontally juxtaposed exchangers.

The first and second turbomachines 28-1 and 28-2 are mounted parallel to each other, that is, the axis of rotation $A_{32-1}$ of the turbine 32-1 of the first turbomachine 28-1 extends parallel to the axis of rotation $A_{32-2}$ of the turbine 32-2 of the second turbomachine 28-2.

In FIGS. 2 to 6, the axes of rotation $A_{32-1}$, $A_{32-2}$ are parallel to the direction Y, that is, mounted horizontally. Of course, the invention is not however limited to this configuration and the axes of rotation $A_{32-1}$, $A_{32-2}$ can be mounted vertically, that is, parallel to the axis Z.

As can also be seen in FIGS. 2 to 6, the volute of the first turbomachine 28-1 comprises a portion 44-1 for guiding air around the turbomachine 32-1 to an air outlet from the module, with reference sign 46-1. In a known manner, the air guiding portion 44-1 advantageously comprises a wall in the shape of a truncated spiral.

Similarly, the volute of the second turbomachine 28-2 comprises a portion 44-2 for guiding air around the turbomachine 32-2 to an air outlet from the module, with reference sign 46-2. The guiding portion 44-2 advantageously comprises a wall in the shape of a truncated spiral.

Figure 2:
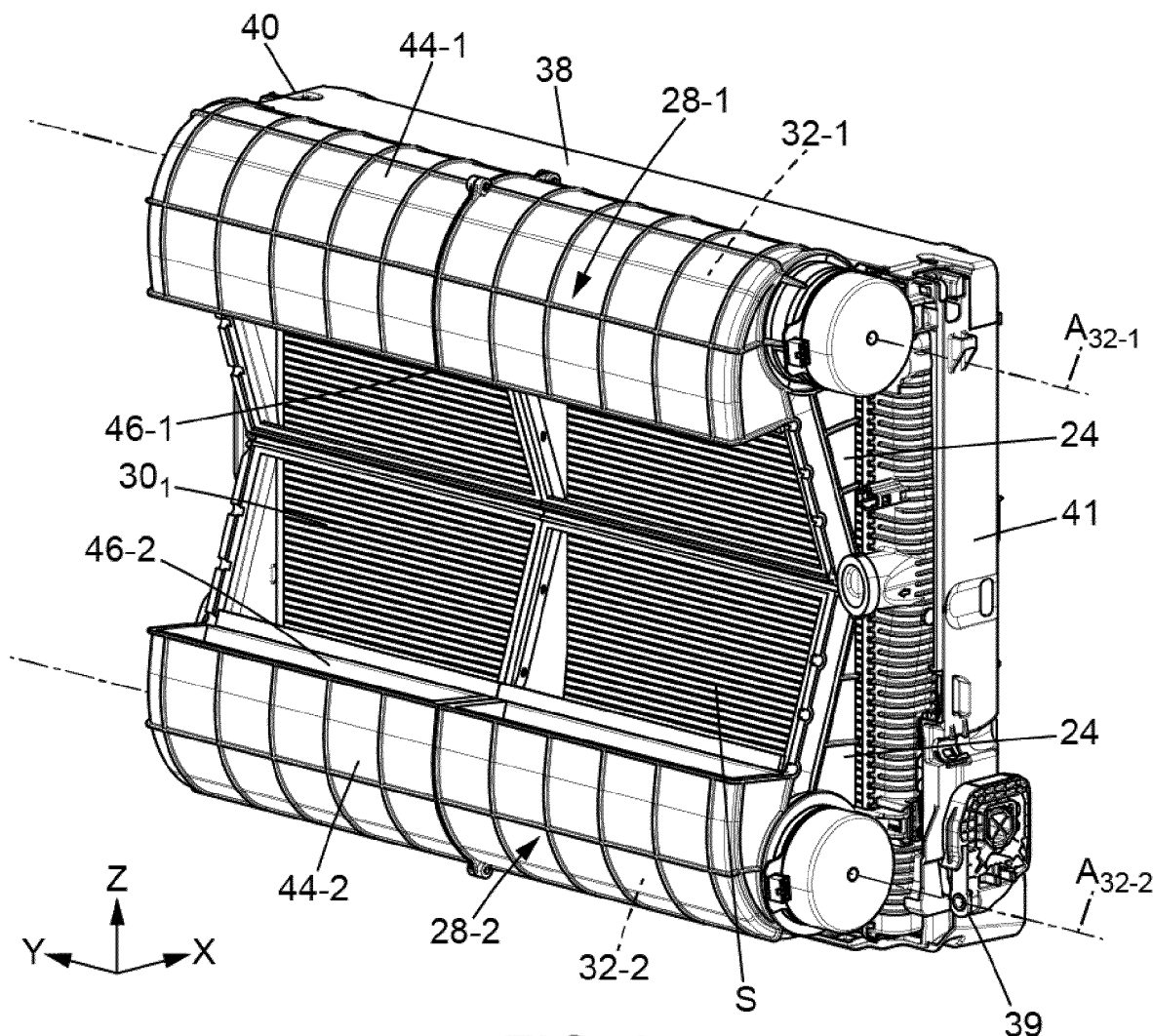
FIG. 2 is a perspective view of a cooling module according to one embodiment, without guiding shutters.

According to the embodiment in FIG. 2, the two outlets 46-1, 46-2 are positioned facing each other.

According to the embodiment in FIGS. 3 to 6, the air outlet 46-1 of the first turbomachine 28-1 is positioned facing the guiding portion 44-2 of the second turbomachine 28-2, which significantly reduces the sound waves generated by the cooling module, compared to the configuration in which the two outlets are facing each other in FIG. 2.

This configuration ensures that the air distribution of an air flow F1 originating from the first turbomachine 28-1 via the associated outlet 46-1 is substantially the same, and in particular in the same direction as the distribution of an air flow F2 originating from the second turbomachine 28-2 via the associated outlet 46-2.

It will be noted that an axis parallel to the direction Z and passing through the middle of the lengths of the assembled heat exchangers is an axis of symmetry of the two assembled turbomachines 28-1, 28-2.

Figure 3:
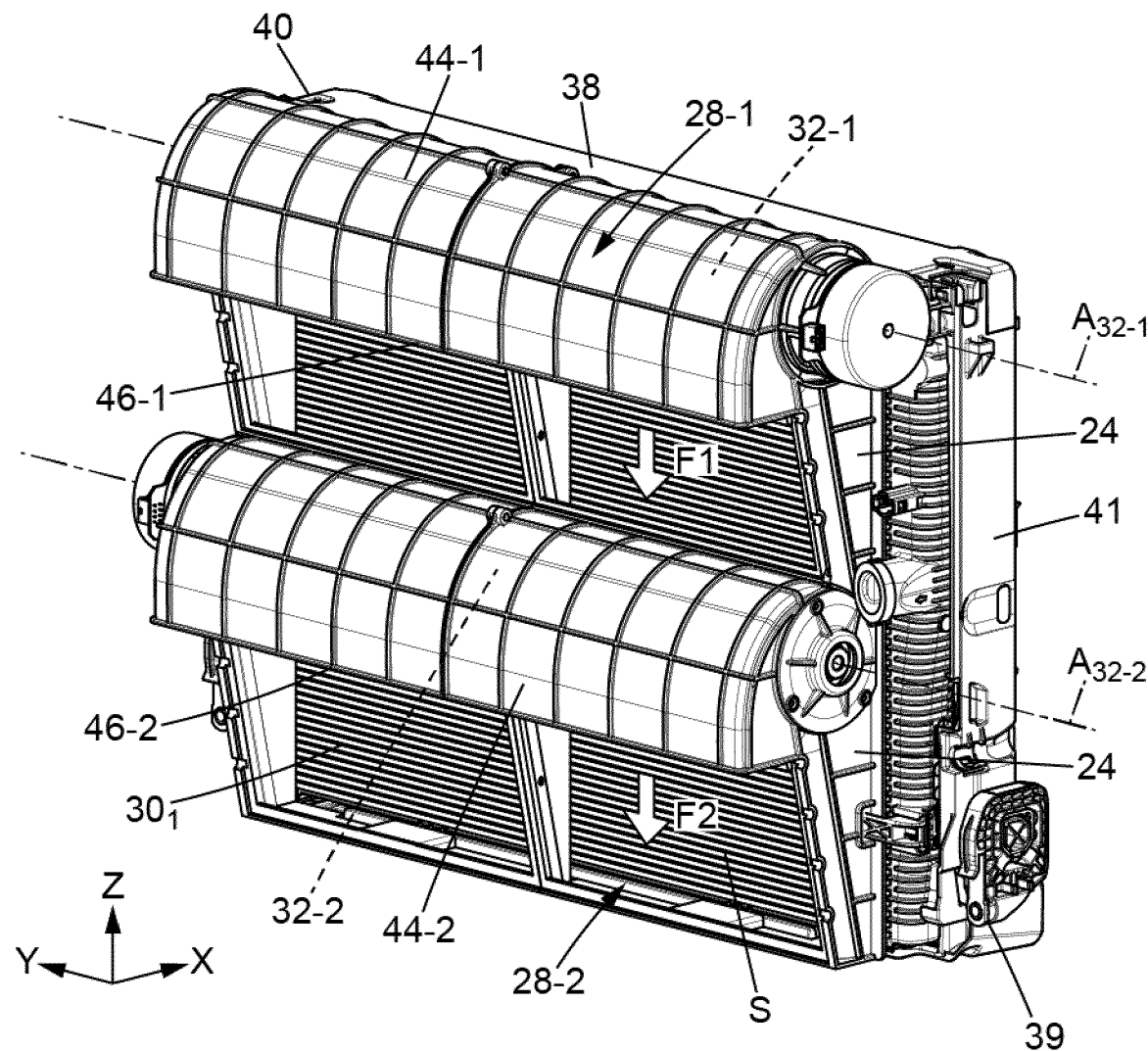
FIG. 3 is a perspective view of a cooling module according to another embodiment, without guiding shutters.
Figure 4:
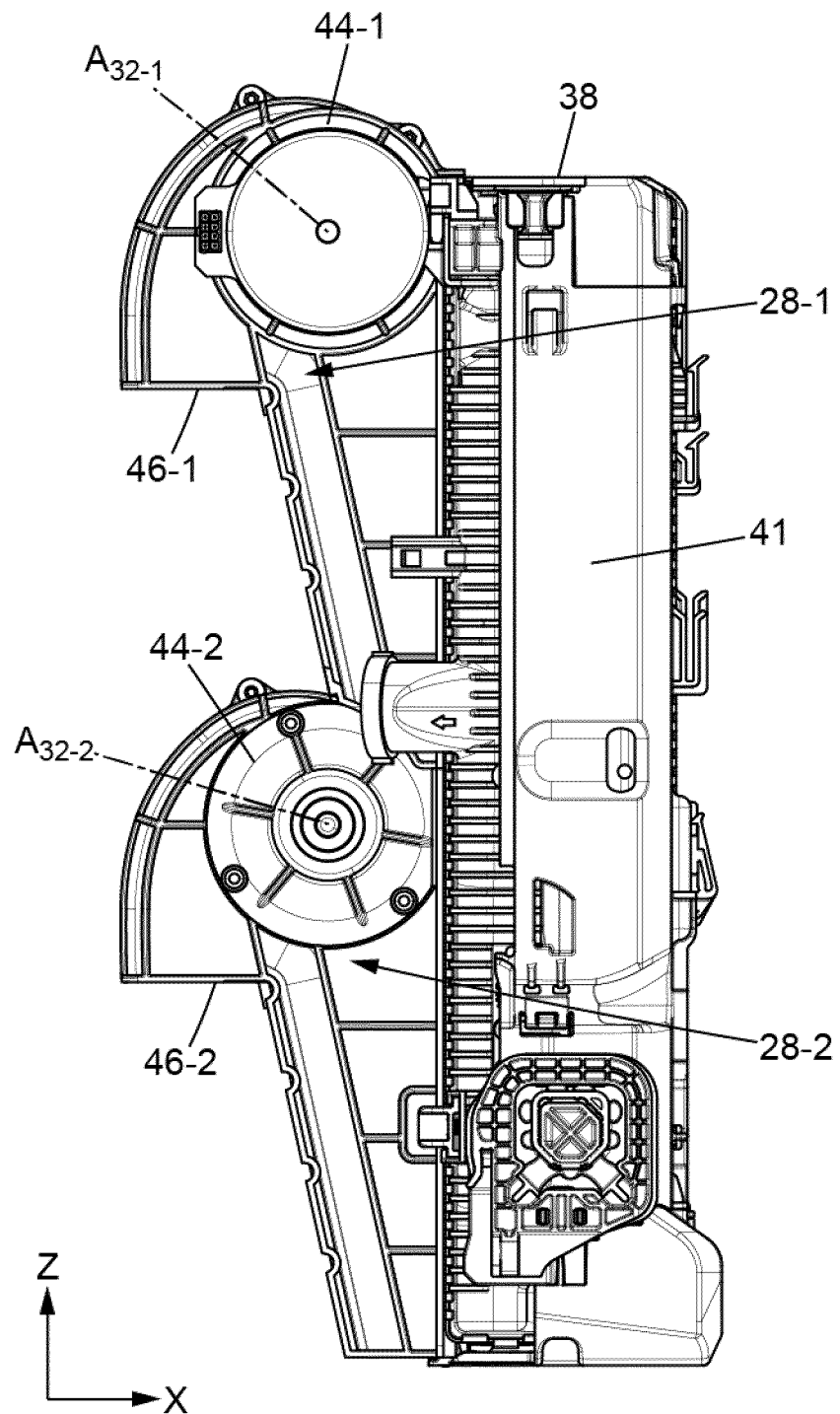
FIG. 4 is a side view of the module in FIG. 3.

As can be seen in FIGS. 3 to 5, the part 44-1, 44-2 of the volute fairing 242 is positioned above the respective outlet 46-1, 46-2, and the air flows F1 and F2 are substantially vertical and downward.

When the vehicle is in a damp, or even wet, environment, such as during rain or when passing through a ford, the turbomachine 28-1, 28-2 is protected, as water cannot be stored in the volute but is instead discharged through the outlet 46-1, 46-2. As a result, any submersion of the cooling module is prevented.

As is also evident from the figures, the axis of rotation $A_{32-1}$ of the first turbomachine 28-1 is positioned facing the end edge 40 of the surface S and the axis of rotation $A_{32-2}$ of the second turbomachine 28-2 is positioned facing the inside of the surface S.

In FIGS. 3 and 4, the axis of rotation $A_{32-2}$ of the second turbomachine 28-2 is positioned in the middle of the height of the surface S.

Figure 6:
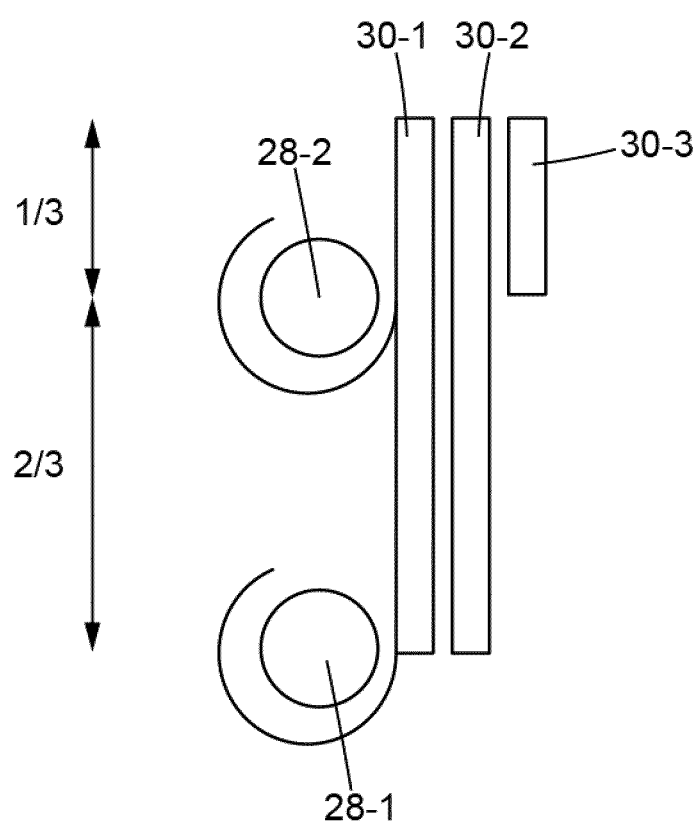
FIG. 6 is a schematic side view of a variant of the module in FIG. 3.

In FIG. 6, the axis of rotation $A_{32-2}$ of the second turbomachine 28-2 is positioned in the upper third of the height of the surface S.

The invention is not however limited to these geometries and, depending on the configuration of the heat exchangers and/or the cooling power required for each exchanger, it is possible to position the turbomachines so that they are dedicated to respective exchangers.

Advantageously, the axis of rotation $A_{32-2}$ of the second turbomachine 28-2 is positioned in a zone between one fifth and four fifths of said height, preferably between one third and two thirds of said height.

As illustrated in FIG. 5, the module 22 is provided with air guiding means 50-1, 50-2 associated with each turbomachine 28-1, 28-2.

Each air guiding means 50-1, 50-2 comprises a set of shutters 52 pivotably mounted between a closed position of the cooling module (as can be seen in FIG. 4) and at least one open position of the cooling module (not illustrated).

The open position is particularly advantageous when the vehicle is travelling at high speed, in which case the turbomachines 28-1, 28-2 can be switched off.

The number of shutters 52 associated with the first turbomachine 28-1 can be identical to or, conversely, different from, the number of shutters 52 associated with the second turbomachine 28-2, depending in particular on the respective positions of the turbomachines.

The invention claimed is:

1. A cooling module for a motor vehicle, comprising:
   at least one heat exchanger defining a surface referred to as a working surface;
   at least a first tangential-flow turbomachine and a second tangential-flow turbomachine, each of said turbomachines being capable of creating a flow of air in contact with said working surface; and
   air guiding shutters pivotably mounted between a closed position of the cooling module and at least one open position of the cooling module;
   wherein each of said turbomachines comprises a rotor rotating about an axis and a volute for housing the rotor, including an air guiding portion and an air outlet from the turbomachine,
   wherein said turbomachines are positioned such that the air outlet of the first turbomachine is positioned facing the guiding portion of the second turbomachine.

2. The cooling module as claimed in claim 1, in which the axis of rotation of the first tangential-flow turbomachine and the axis of rotation of the second tangential-flow turbomachine are mounted parallel to each other.

3. The cooling module as claimed in claim 1, in which the axis of rotation of the first turbomachine is positioned facing an end edge of the working surface and the axis of rotation of the second turbomachine is positioned facing an inside of the working surface.

4. The cooling module as claimed in claim 3, in which the working surface is delimited by a first direction, referred to as a length, and a second direction, referred to as a height, orthogonal to the length, the axis of rotation of the second turbomachine being positioned in a zone between one fifth and four fifths of said height.

5. The cooling module as claimed in claim 4, in which the axis of rotation of the second turbomachine is positioned in a zone between one third and two thirds of said height.

6. The cooling module as claimed in claim 1, in which, in an installed position of the module in the motor vehicle, the outlet of the first turbomachine is positioned facing the guiding portion of the second turbomachine.

7. A motor vehicle, comprising a body, a bumper, and a cooling module as claimed in claim 1, the body defining at least one cooling opening positioned below the bumper, the cooling module being positioned facing the at least one cooling opening.

* * * * *